J. LEDWINKA.
METHOD OF AND MEANS FOR VULCANIZING RUBBER TIRES.
APPLICATION FILED DEC. 11, 1916. RENEWED JAN. 8, 1920.

1,348,228.  Patented Aug. 3, 1920.

Inventor
Joseph Ledwinka
By his Attorney
Samuel E. Darby

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

METHOD OF AND MEANS FOR VULCANIZING RUBBER TIRES.

1,348,228.     Specification of Letters Patent.     Patented Aug. 3, 1920.

Application filed December 11, 1916, Serial No. 136,247. Renewed January 8, 1920. Serial No. 350,064.

*To all whom it may concern:*

Be it known that I, JOSEPH LEDWINKA, a citizen of the United States, residing at Philadelphia, county of Philadelphia, State of Pennsylvania, have made a certain new and useful Invention in Methods of and Means for Vulcanizing Rubber Tires, of which the following is a specification.

This invention relates to a new method of and apparatus for vulcanizing rubber tires.

The object of the invention is to provide a method of and apparatus for vulcanizing tires which is simple, economical and efficient.

A further object of the invention is to provide means for electrically vulcanizing rubber tires.

Further objects of the invention will appear more fully hereinafter.

The invention consists substantially in the method of application of the principles involved together with the combination, location and relative arrangement of parts all as will be more fully hereinafter set forth, as shown by the accompanying drawing and finally pointed out in the appended claims.

Referring to the drawing:—

The same part is designated by the same reference numeral wherever it occurs throughout the several views.

In the manufacture of rubber tires for automobiles or the like, it is the present practice to build up the tires on cast iron cores and bolt a metal casing around the same, and finally inclose this unit into a vessel into which steam is admitted under pressure which furnishes sufficient heat to vulcanize the tire inside the core and casing. This process necessitates a steam tight casing, and metal molds which are very heavy and cumbersome to handle. Further, due to the large amount of metal in the molds, a very great amount of steam is necessary to get the molds hot enough to penetrate to the rubber to vulcanize the tire. From this it will be seen that the process and apparatus at present generally employed is one that is at present generally employed is one that is extremely expensive, laborious, and the operation requires a great deal of time, all of which are serious objections recognized by the art.

It is among the purposes of my present invention to overcome these objections and to provide an electric induction vulcanizer which is cheap to build, easy to operate and whereby the cost of and time of operation is greatly reduced.

In accordance with my invention I provide a tire mold, preferably of metal, and formed in halves, as indicated at 1, 2, which half casings are suitably secured together, for example by bolts 3, to securely clamp the rubber tire 4 around the core 5. The casing thus made up, and which I will generally designate at 6, forms a continuous metal ring as shown. In accordance with the principles of my invention, I make this ring form a single turn secondary coil of a transformer, the primary coil of which I show at 7, and the transformer core at 8.

Figure 1:
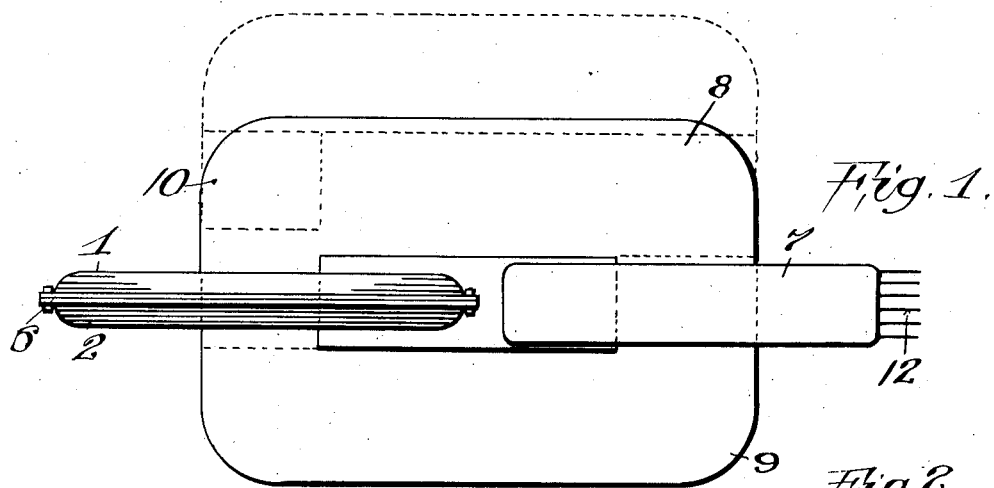
Figure 1 is a plan view of a vulcanizer embodying my invention.
Figure 2:
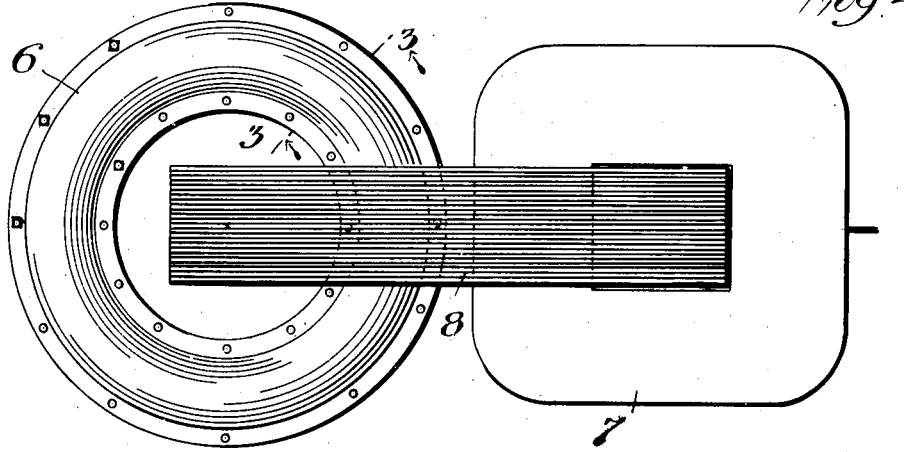
Fig. 2 is a view in elevation of the same.
Figure 3:
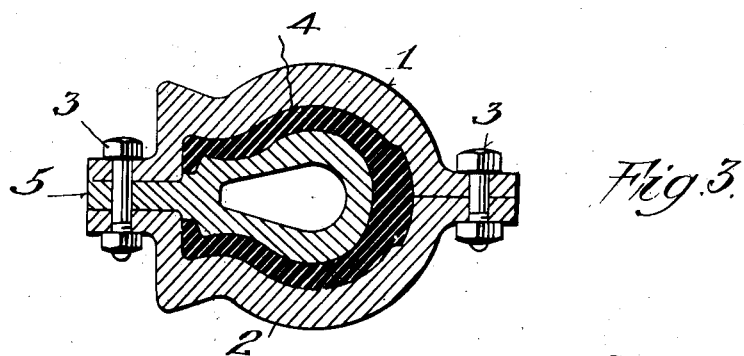
Fig. 3 is a sectional view taken on the line 3—3, Fig. 2, and looking in the direction of the arrows.

The core 8 is built up in the usual manner of laminated sheet iron, and it is formed in two parts as shown at 9, 10, which are readily separated as indicated in dotted lines, Fig. 1, to allow the ready removability of the tire mold. The primary coil 7 of the transformer may be divided into any desired number of sections, with leads 12 to allow a wide range of heat control.

From the foregoing the operation of the vulcanizing device is obvious the tire mold is made up and inserted in the core 8 of the transformer, and the core is closed to its normal position. Current is then supplied to the primary coil 7 of the transformer. A current of low voltage, but relatively high in amperes will be induced into the tire mold, which, due to the resistance offered to the flow of current by the metal thereof will become quickly heated, the intensity of the heat being easily controlled by the number and mode of connection of the sections of the primary coil 7.

Having now set forth the objects and nature of my invention, what I claim as new and useful, and desire to secure by Letters Patent, is:—

1. The method of vulcanizing which consists in applying the article to be vulcanized to a forming core and inclosing the article and forming core within a metal mold, then threading the core of an electric transformer through the mold and through the primary coil of the transformer, whereby the mold and forming core become the secondary of the transformer, and finally supplying current to the primary coil of the transformer.

2. The combination with a forming core adapted to be inserted in a tire to be vulcanized, of a ring shaped mold to inclose the tire and forming core, a primary transformer coil and a transformer core, said core respectively threading through said coil and mold, said mold constituting the secondary of the transformer.

3. The combination with a forming core adapted to be received within a tire to be vulcanized, of a ring shaped tire mold to inclose the forming core and tire, a primary coil of a transformer, and a transformer core, one portion of said core being threaded through said coil and the other portion thereof threaded through said mold.

4. The combination with a forming core adapted to be inserted within a tire to be vulcanized, of a ring shaped mold to inclose the forming core and tire, a primary transformer coil, and a transformer core, said transformer core being made in separable sections to permit the same to be threaded respectively through said coil and mold, the mold constituting the secondary coil of the transformer.

5. The combination with a forming core adapted to be inserted within a tire to be vulcanized, of a metal tire mold to inclose the tire and forming core, said mold composed of ring shaped separable sections, a primary transformer coil, and a transformer core, having portions thereof respectively threaded through said coil and ring shaped mold, the latter constituting the secondary of the transformer.

6. The combination with a forming core adapted to be inserted within a tire to be vulcanized, of a ring shaped metal mold to inclose the forming core and tire, the primary coil of a transformer, said coil composed of a plurality of sections, a transformer core respectively threaded through said coil and mold, the latter constituting the secondary of the tranformer, and means for supplying current to any number of said primary coil sections.

7. The method of vulcanizing which consists in applying the article to be vulcanized to a forming core, and inclosing the tire and core within a ring shaped metal mold, and constituting the mold and core, a single turn secondary coil of a transformer, then threading a transformer core respectively through said single turn secondary coil, and the primary coil of the transformer, and finally supplying current to the primary coil of the transformer.

In testimony whereof I have hereunto set my hand, in the presence of the subscribing witnesses, on this 29th day of November, A. D. 1916.

JOSEPH LEDWINKA.

Witnesses:
   A. H. BUXBAUM,
   L. R. HILYARD.